(12) United States Patent
Kim

(10) Patent No.: US 9,753,162 B2
(45) Date of Patent: Sep. 5, 2017

(54) APPARATUS FOR DETECTING INFRASOUND

(71) Applicant: KOREA INSTITUTE OF GEOSCIENCE AND MINERAL RESOURCES, Daejeon (KR)

(72) Inventor: Tae Sung Kim, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 14/819,935

(22) Filed: Aug. 6, 2015

(65) Prior Publication Data

US 2016/0054459 A1    Feb. 25, 2016

(30) Foreign Application Priority Data

Aug. 20, 2014  (KR) .......................... 10-2014-0108138

(51) Int. Cl.
*G01V 1/00*    (2006.01)
*G01H 3/00*    (2006.01)

(52) U.S. Cl.
CPC .............. *G01V 1/001* (2013.01); *G01H 3/00* (2013.01)

(58) Field of Classification Search
USPC ........................................................ 367/140
See application file for complete search history.

(56) References Cited

U.S. PATENT DOCUMENTS

| 5,161,126 A | * | 11/1992 | Marcus | .................... G01D 5/44 367/907 |
| 2003/0133588 A1 | * | 7/2003 | Pedersen | ............... B81B 3/0072 381/423 |
| 2004/0057589 A1 | * | 3/2004 | Pedersen | ............... G01L 9/0073 381/152 |

(Continued)

FOREIGN PATENT DOCUMENTS

| JP | 63-154929 | 6/1988 |
| JP | 2011-059064 | 3/2011 |

(Continued)

OTHER PUBLICATIONS

Korean Intellectual Property Office "Notice to Submit Response", mailed Sep. 29, 2014, 2 pages.

(Continued)

*Primary Examiner* — James Hulka
(74) *Attorney, Agent, or Firm* — Norton Rose Fulbright US LLP

(57) ABSTRACT

Disclosed herein is an apparatus for detecting infrasound. The apparatus for detecting infrasound includes a sound wave detector including a diaphragm dividing an inner space of a first container into a first space and a second space, and a microchannel assembly including a second container having an inner space with one of the spaces divided by the diaphragm and a plurality of microchannels having different resistance values with respect to transmission of a sound wave, and exposing the inner space of the second container to the air through one of the plurality of microchannels. Such an apparatus for detecting infrasound may have various cut-off frequencies according to the number of the microchannels.

7 Claims, 2 Drawing Sheets

(56) References Cited

U.S. PATENT DOCUMENTS

| | | | | |
|---|---|---|---|---|
| 2007/0003082 A1* | 1/2007 | Pedersen | ............... | B81B 3/0072 |
| | | | | 381/191 |
| 2007/0201710 A1* | 8/2007 | Suzuki | ................. | B81B 3/0072 |
| | | | | 381/174 |
| 2010/0158279 A1* | 6/2010 | Conti | ....................... | H04R 7/24 |
| | | | | 381/174 |
| 2010/0166230 A1* | 7/2010 | Tseng | ..................... | H04R 1/028 |
| | | | | 381/150 |
| 2012/0257777 A1* | 10/2012 | Tanaka | ................... | H04R 19/04 |
| | | | | 381/355 |
| 2015/0078593 A1* | 3/2015 | Uchida | ............... | H04R 19/005 |
| | | | | 381/191 |
| 2015/0104048 A1* | 4/2015 | Uchida | ................... | H04R 7/06 |
| | | | | 381/174 |
| 2015/0181346 A1* | 6/2015 | Jingming | ................ | H04R 1/02 |
| | | | | 381/114 |

FOREIGN PATENT DOCUMENTS

| | | | | |
|---|---|---|---|---|
| JP | 2013-024604 | 2/2012 | | |
| JP | WO 2013179990 A1 * | 12/2013 | ............... | H04R 7/06 |

OTHER PUBLICATIONS

Korean Intellectual Property Office, "Decision to Grant", mailed Nov. 11, 2014, 2 pages.

* cited by examiner

APPARATUS FOR DETECTING INFRASOUND

CROSS-REFERENCE TO RELATED APPLICATION

This application claims priority to and the benefit of Korean Patent Application No. 10-2014-0108138, filed on Aug. 20, 2014, the disclosure of which is incorporated herein by reference in its entirety.

BACKGROUND

1. Field of the Invention

The present invention relates to an apparatus of detecting infrasound, which can detect infrasound by a differential pressure method.

2. Discussion of Related Art

Infrasound is a sound wave in a low frequency band between 0.01 and 20 Hz, which is lower than an audible frequency for human beings. Infrasound observation is one of the technologies used in monitoring of nuclear tests occurring from all over the world as a part of an International Monitoring System (IMS) technique, which is a monitoring system of the Comprehensive Test Ban Treaty (CTBT) along with monitoring using seismic waves, hydroacoustic waves or radionuclides. Today, infrasound provides important data to research for discrimination between artificial explosion and earthquake occurring on the earth's surface and in the air, in addition to the monitoring of nuclear tests.

The research on infrasound was on the rise as an important method for monitoring nuclear tests in the atmosphere in 1940s to 1950s, but declined by the treaty of banning nuclear weapons in the atmosphere and under water of 1963. However, as the CTBT was proposed by the United Nations in 1996, and to this end, the IMS for the task of detecting nuclear tests in the world was operated, worldwide infrasound monitoring stations are being established according to an IMS construction plan, and today, research using acquired data is actively being conducted in all over the world.

Sound sources of infrasound may include a nuclear test, volcanic eruption, the movement of a meteorite, typhoon, landslide, aurora, earthquake, artificial explosion, a supersonic airplane, missile launching, atmospheric flow change in a mountainous area, a flight vehicle in the atmosphere, etc. An observation object is a change in atmospheric pressure occurring by such a sound source, and an apparatus for observing IMS infrasound should measure standard volume displacement caused by an atmospheric pressure as low as 0.01 microbar using a microbarometer, and have a consistent reaction in a low frequency band of 0.01 to 20 Hz.

Meanwhile, since infrasound to be detected propagates into the air with variable atmospheric pressures, an apparatus for detecting infrasound generally needs a component for filtering pressure variation of a frequency according to a significant frequency band of the sound source to be studied, and therefore research on such a component is now being conducted.

SUMMARY OF THE INVENTION

Therefore, it is an aspect of the present invention to provide an apparatus for detecting infrasound having a plurality of cut-off frequencies which can be controlled.

The apparatus for detecting infrasound according to an exemplary embodiment of the present invention includes a sound wave detector and a sound wave filter. The sound wave detector may include a first container including a first inner space, a diaphragm dividing the first inner space into a first space and a second space, an input port exposing the first space in the air, and an electrode structure disposed in the second space to face the diaphragm and constituting a capacitor with the diaphragm. The sound wave filter may include a second container having a second inner space connected to the second space and a microchannel assembly joined to the second container, including a plurality of microchannels having different resistance values with respect to transmission of a sound wave, and exposing the second inner space to the air through one of the plurality of microchannels.

In one exemplary embodiment, the sound wave detector may further include a voltage output device electrically connected to the electrode structure to output a voltage of the capacitor.

In one exemplary embodiment, the microchannel assembly may further include a connective structure joined to the second container and connecting one of the plurality of microchannels to an inner space of the second container. As an example, the plurality of microchannels may include a first microchannel having a length and an inner diameter, which correspond to a first resistance value; a second microchannel having a length and an inner diameter, which correspond to a second resistance value smaller than the first resistance value; and a third microchannel having a length and an inner diameter, which correspond to a third resistance value smaller than the second resistance value. The connective structure may connect one of the first to third microchannels to the inner space of the second container.

In one exemplary embodiment, the connective structure may include a microchannel connective cap joined to the second container and including a first opening connected to the inner space of the second container; and a microchannel holder including a plurality of second openings into which the microchannels are inserted, respectively, and joined to the microchannel connective cap to rotate. In this case, the plurality of second openings may be aligned in a round shape such that each of the plurality of microchannels is connected to the first opening by rotation of the microchannel holder.

In one exemplary embodiment, the apparatus for detecting infrasound according to the exemplary embodiment of the present invention may further include a case including a sidewall forming a third inner space accommodating the sound wave detector and the sound wave filter and an opening formed in the sidewall to expose the third inner space to an external air; and a support joined to the case, supporting the case to be spaced apart from a surface on which the case is installed and including an elastic body absorbing vibration of the surface.

In one exemplary embodiment, the apparatus for detecting infrasound according to the exemplary embodiment of the present invention may further include a voltage amplifier disposed in the case, electrically connected to the voltage output device to amplify an output voltage of the voltage output device and transmit it out of the case.

The apparatus for detecting infrasound according to the exemplary embodiment of the present invention may detect infrasound by vibration of a diaphragm including a first surface exposed to the air and a second surface opposite to the first surface and include a microchannel assembly including a plurality of microchannels having different resistance values with respect to transmission of a sound wave, and exposing an enclosed space in contact with the second surface to the air through one of the plurality of microchannels.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, exemplary embodiments of the present invention will be described in detail with reference to the accompanying drawings.

Figure 1:
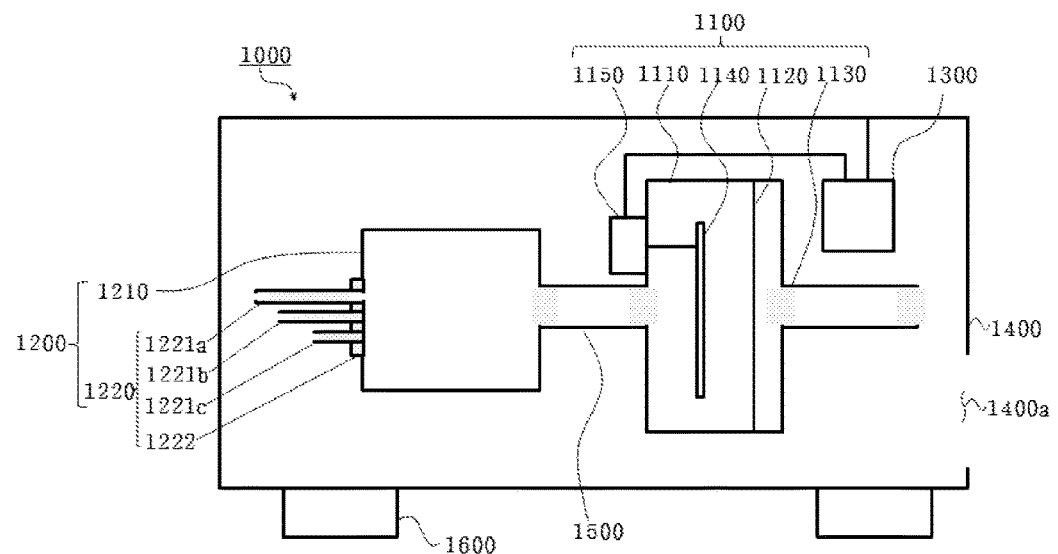
FIG. 1 is a diagram illustrating an apparatus for detecting infrasound according to an exemplary embodiment of the present invention.

FIG. 1 is a diagram illustrating an apparatus for detecting infrasound according to an exemplary embodiment of the present invention.

Referring to FIG. 1, an apparatus for detecting infrasound 1000 according to an exemplary embodiment includes a sound wave detector 1100 and a sound wave filter 1200.

The sound wave detector 1100 may detect infrasound and generate a voltage corresponding to the infrasound. In one exemplary embodiment, the sound wave detector 1100 may include a first container 1110, a diaphragm 1120, an input port 1130, an electrode structure 1140 and a voltage output device 1150.

The first container 1110 may include an inner space accommodating the diaphragm 1120 and the electrode structure 1140. The diaphragm 1120 may be disposed in the first container 1110, and divide the inner space of the first container 1110 into two spaces, that is, a first space and a second space. The input port 1130 may be joined to one side of the first container 1110, and expose the first space of the inner space of the first container 1110 to the air. The input port 1130 may be formed in, for example, a tube shape in which both ends are open. The electrode structure 1140 may be disposed in the second space of the inner space of the first container 1110 to face the diaphragm 1120. The electrode structure 1140 may be a single structure, or a structure consisting of a plurality of divided electrodes. Such an electrode structure 1140 may constitute a capacitor with the diaphragm 1120. The voltage output device 1150 may be electrically connected to the electrode structure 1140 and output a voltage generated between the electrode structure 1140 and the diaphragm 1120.

In such a sound wave detector 1100, when a sound wave in the air comes into the inner space of the first container 1110 through the input port 1130, the diaphragm 1120 vibrates due to the sound wave coming into the first container 1110. As a result, an interval between the diaphragm 1120 and the electrode structure 1140 is changed. As such, in a state that the diaphragm 1120 has the same electric charge as the electrode structure 1140, when the interval between the diaphragm 1120 and the electrode structure 1140 is changed, a voltage generated between the diaphragm 1120 and the electrode structure 1140 is changed. Such a voltage change may be output through the voltage output device 1150, thereby detecting the sound.

The sound wave filter 1200 may serve to decrease an influence by a pressure change of the air to a frequency lower than a specific frequency (hereinafter, referred to as "cut-off frequency") such that the apparatus for detecting infrasound 1000 according to the exemplary embodiment of the present invention detects only sound waves with frequencies equal to or greater than the cut-off frequency. Since the apparatus for detecting infrasound 1000 has to detect infrasound propagating in the air in which an atmospheric pressure is continuously changed, it is necessary to reduce the influence by the change in the atmospheric pressure. In addition, to improve sensitivity to the infrasound with a frequency to be measured by a user, an influence by a sound wave with a frequency equal to or less than a specific frequency should be reduced. The sound wave filter 1200 serves to reduce the influence by the sound wave with the frequency less than the cut-off frequency or the variation in atmospheric pressure, which are described above.

The sound wave filter 1200 may include a second container 1210 and a microchannel assembly 1220.

The second container 1210 may include an inner space connected to the second space of the inner space of the first container 1110. In one exemplary embodiment, the inner space of the second container 1210 may be spatially connected to the second space of the first container 1110 through a connective tube 1500. Alternatively, in another exemplary embodiment, the second container 1210 may be formed in a single body with the first container 1110, and the inner space of the second container 1210 may be the same space as the second space of the first container 1110. Meanwhile, to reduce an influence by a change in external temperature, in the inner space of the second container 1210, a temperature maintaining unit (not shown) formed of a material having a high specific heat and less changed in volume according to a temperature may be disposed.

The microchannel assembly 1220 may include a plurality of microchannels 1221a, 1221b and 1221c, and one of the plurality of microchannels 1221a, 1221b and 1221c may be spatially connected to the inner space of the second container 1210. The inner space of the second container 1210 may be exposed to the air through the microchannel (1221a of FIG. 1) connected thereto. The plurality of microchannels 1221a, 1221b and 1221c may have different resistance values with respect to transmission of a sound wave. For example, the resistance to transmission of a sound wave is influenced by inner diameters and lengths of the microchannels 1221a, 1221b and 1221c, and thus at least one of the lengths and the inner diameters of the plurality of microchannels 1221a, 1221b and 1221c may be different from the others. In one exemplary embodiment, the microchannel assembly 1220 may include three microchannels 1221a, 1221b and 1221c shown in FIG. 1. The length and inner diameter of the first microchannel 1221a of the three microchannels 1221a, 1221b and 1221c may be determined to have a first resistance value with respect to the transmission of a sound wave, the length and inner diameter of the second microchannel 1221b of the three microchannels 1221a, 1221b and 1221c may be determined to have a second resistance value smaller than the first resistance value with respect to the transmission of a sound wave, and the length and inner diameter of the third microchannel 1221c of the three microchannels 1221a, 1221b and 1221c may be determined to have a third resistance value smaller than the second resistance value with respect to the transmission of a sound wave.

Meanwhile, the volume of the inner space of the second container 1210 and the resistance value with respect to the transmission of a sound wave of the microchannel 1221a connected to the inner space of the second container 1210 have an influence on the cut-off frequency of the apparatus for detecting infrasound. This is because the apparatus for detecting infrasound 1000 according to the exemplary embodiment of the present invention detects infrasound using the difference in pressure between both sides of the diaphragm 1120. Specifically, since, with respect to the change in pressure of the air with a relatively high frequency, that is, a frequency equal to or higher than the cut-off frequency, the space connected to the air through the input port 1130 of the spaces at both sides of the diaphragm 1120 rapidly responds to the change in pressure of the air, but the space connected to the air through the microchannel 1221a does not rapidly respond to the change in pressure of the air, a pressure difference is generated in the spaces at both sides of the diaphragm 1120. The apparatus for detecting infrasound 1000 according to the exemplary embodiment of the present invention may detect infrasound by measuring such a pressure difference. However, with respect to the change in pressure of the air having a sufficiently low frequency less than the cut-off frequency, since the space connected to the air through the microchannel 1221a may also sufficiently respond to the change in pressure of the air, there is no difference in pressure of the spaces at both sides of the diaphragm 1120, and as a result, the apparatus for detecting infrasound 1000 according to the exemplary embodiment of the present invention does not detect the change in pressure with a frequency less than the cut-off frequency.

Accordingly, a response speed to the change in pressure of the air in the space connected to the air through the microchannel 1221a of the spaces at both sides of the diaphragm 1120 has an influence on the cut-off frequency, and a response speed of the space to the change in pressure of the air is influenced by the resistance value with respect to the transmission of a sound wave of the microchannel 1221a and the volume of the space. Theoretically, the cut-off frequency (Fc) of the apparatus for detecting infrasound 1000 has a relationship expressed by Equation 1 between the resistance value (R) with respect to the transmission of a sound wave of the microchannel 1221a and the volume (C) of the space connected to the air through the microchannel 1221a.

$$F_c = \frac{1}{RC}$$ Equation 1

Accordingly, as described above, when the microchannel assembly 1220 includes the three microchannels 1221a, 1221b and 1221c, the apparatus for detecting infrasound 1000 according to the exemplary embodiment of the present invention may have three different cut-off frequencies. That is, when the first microchannel 1221a is connected with the inner space of the second container 1210, the apparatus for detecting infrasound 1000 according to the exemplary embodiment of the present invention may have a first cut-off frequency, when the second microchannel 1221b is connected to the inner space of the second container 1210, may have a second cut-off frequency higher than the first cut-off frequency, and when the third microchannel 1221c is connected to the inner space of the second container 1210, may have a third cut-off frequency higher than the second cut-off frequency.

The microchannel assembly 1220 may further include a connective structure 1222 to connect one of the plurality of microchannels 1221a, 1221b and 1221c to the inner space of the second container 1210. The connective structure 1222 will be described with reference to FIGS. 2 to 4.

The apparatus for detecting infrasound 1000 according to the exemplary embodiment of the present invention may further include a case 1400, a support 1600 and a voltage amplifier 1300.

The case 1400 may serve to protect the sound wave detector 1100 and the sound wave filter 1200 from an external environment. As an example, the case 1400 may include a sidewall forming an inner space accommodating the sound wave detector 1100 and the sound wave filter 1200 and an opening 1400a formed in the sidewall to expose the inner space to an external air.

The support 1600 may be joined to a lower portion of the case 1400, and support the case 1400 to be spaced apart from the ground when the case 1400 is installed to a measuring place. The support 1600 may include an elastic body capable of absorbing vibration of the ground.

The voltage amplifier 1300 may be disposed in the case 1400, and electrically connected to the voltage output device 1150 to amplify an output voltage of the voltage output device 1150 and transmit it to an outside.

Figure 2:
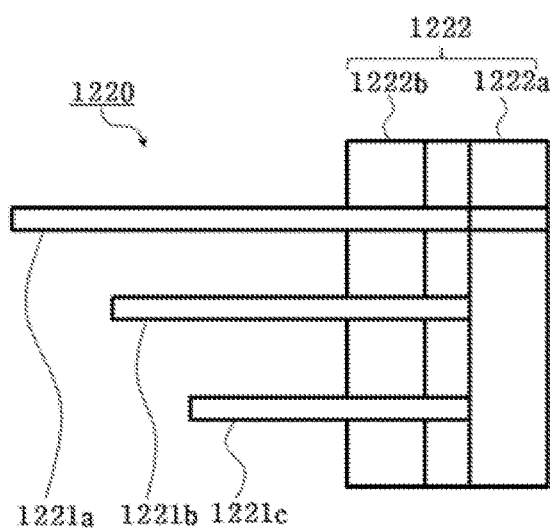
FIG. 2 is a diagram illustrating an exemplary embodiment of a microchannel assembly shown in FIG. 1.
Figure 3:
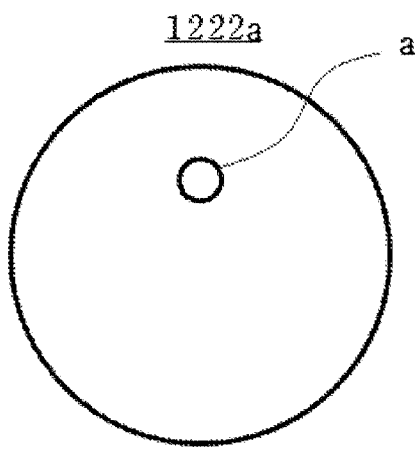
FIG. 3 is a plan view of a microchannel connective cap shown in FIG. 2.
Figure 4:
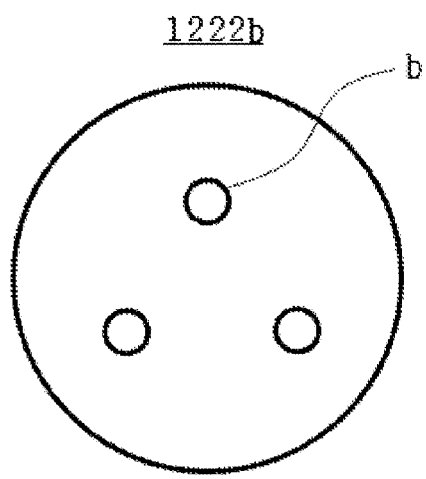
FIG. 4 is a plan view of a microchannel holder shown in FIG. 2.

FIG. 2 is a diagram illustrating an exemplary embodiment of a microchannel assembly shown in FIG. 1, FIG. 3 is a plan view of a microchannel connective cap shown in FIG. 2, and FIG. 4 is a plan view of a microchannel holder shown in FIG. 2.

Referring to FIGS. 1, 2 and 4, the microchannel assembly 1220 may include the plurality of microchannels 1221a, 1221b and 1221c and the connective structure 1222 described above, and the connective structure 1222 may include a microchannel connective cap 1222a and a microchannel holder 1222b.

The microchannel connective cap 1222a may be joined to one side of the second container 1210, and include a first opening (a) to connect one of the plurality of microchannels 1221a, 1221b and 1221c to the inner space of the second container 1210.

The microchannel holder 1222b may include a plurality of second openings (b) into which the plurality of microchannels 1221a, 1221b and 1221c are inserted, respectively, so that the microchannels 1221a, 1221b and 1221c can be grabbed by the microchannel holder 1222b and joined to the microchannel connective cap 1222a to be rotatable. As an exemplary embodiment, the microchannel holder 1222b may be formed in a round disc shape in which the plurality of second openings (b) are aligned in a round shape.

When such a microchannel assembly 1220 is included, only one of the plurality of microchannels 1221a, 1221b and 1221c may be connected to the inner space of the second container 1210 through the first opening (a) by rotating the microchannel holder 1222b grabbing the plurality of microchannels 1221a, 1221b and 1221c by a user, and as a result, the cut-off frequency of the apparatus for detecting infrasound 1000 according to the exemplary embodiment of the present invention may be easily changed according to the number of the microchannels 1221a, 1221b and 1221c by handling of the user.

According to the present invention, a plurality of microchannels having different resistance values with respect to transmission of a sound wave are selectively connected to an inner space of a second container, and thus a cut-off frequency of an apparatus for detecting infrasound can be easily changed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for detecting infrasound, comprising:
   a sound wave detector comprising a first container that defines a first inner space, a diaphragm dividing the first inner space into a first compartment and a second compartment, an input port exposing the first compartment to an external air, and an electrode structure disposed in the second compartment to face the diaphragm and constituting a capacitor with the diaphragm; and
   a sound wave filter comprising a second container that defines a second inner space connected to the second compartment, and a microchannel airway assembly joined to the second container, that defines a plurality of microchannel airways with different acoustic resistance values with respect to transmission of a sound wave, and exposing the second inner space to the external air through only one of the plurality of microchannel airways,
   wherein the microchannel airway assembly comprises a plurality of tubular microchannel units respectively defining the plurality of microchannel airways and a connective structure selectively connecting the only one of the plurality of tubular microchannel units to the second inner space so that the second inner space is exposed to the air through only one of the plurality of microchannel airways,
   wherein the connective structure comprises a microchannel airway connective cap joined to the second container that defines a first opening connected to the second inner space; and a microchannel airway holder that defines a plurality of second openings into which the tubular microchannel units are inserted, respectively, and joined to the microchannel airway connective cap to be rotatable.

2. The apparatus of claim 1, wherein the sound wave detector further comprises a voltage output device electrically connected to the electrode structure and outputting a voltage of the capacitor.

3. The apparatus of claim 1, wherein the plurality of microchannel airways comprises:
   a first microchannel airway having a length and an inner diameter, which correspond to a first acoustic resistance value;
   a second microchannel airway having a length and an inner diameter, which correspond to a second acoustic resistance value lower than the first acoustic resistance value; and
   a third microchannel airway having a length and an inner diameter, which correspond to a third acoustic resistance value lower than the acoustic second resistance value,
   wherein the connective structure connects only one of the first to third microchannel airways to the second inner space.

4. The apparatus of claim 1, wherein the plurality of second openings are aligned in a round shape to connect each of the plurality of microchannel airways to the first opening by rotation of the microchannel airway holder.

5. The apparatus of claim 1, further comprising:
   a case including a sidewall that defines a third inner space accommodating the sound wave detector and the sound wave filter and the sidewall defines a sidewall opening formed in the sidewall to expose the third inner space to the external air; and
   a support joined to the case, supporting the case to be spaced apart from a surface on which the case is installed and including an elastic body absorbing vibration of the surface.

6. The apparatus of claim 5, wherein the sound wave detector further comprises a voltage output device electrically connected to the electrode structure and outputting a voltage of the capacitor; and
   the apparatus for detecting infrasound further comprises a voltage amplifier disposed in the case, and electrically connected to the voltage output device to amplify an output voltage of the voltage output device and transmit it out of the case.

7. An apparatus for detecting infrasound, which detects infrasound by vibration of a diaphragm including a first surface exposed to an external air and a second surface opposite to the first surface, comprising:
   a container defining an inner space to receive the diaphragm, wherein the diaphragm divides the inner space into a first compartment in contact with the first surface and a second compartment in contact with the second surface, the first compartment is exposed to the external air through an input port, and the second compartment is enclosed;
   a microchannel airways assembly jointed to the container, that defines a plurality of microchannel airways having different acoustic resistance values with respect to transmission of a sound wave, the enclosed second compartment space being exposed to the external air through only one of the plurality of microchannel airways,
   wherein the microchannel airway assembly comprises a plurality of tubular microchannel units respectively defining the plurality of microchannel airways and a connective structure selectively connecting only one of the plurality of tubular microchannel units to the container so that the second compartment is exposed to the air by the only one of the plurality of microchannel airways,
   wherein the connective structure comprises a microchannel airway connective cap joined to the container that defines a first opening connected to the second compartment and a microchannel airway holder that defines a plurality of second openings into which the tubular microchannel units are inserted, respectively, and joined to the microchannel airway connective cap to be rotatable.

* * * * *